No. 727,357. PATENTED MAY 5, 1903.
W. HART.
GRAPHOPHONE REPRODUCER.
APPLICATION FILED AUG. 7, 1902.
NO MODEL.
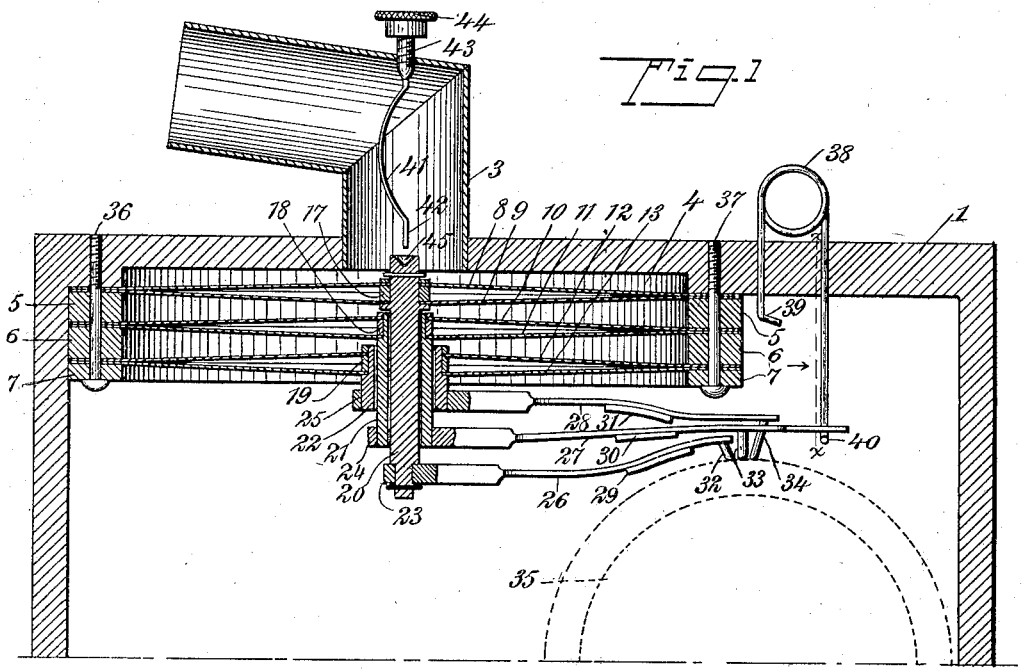
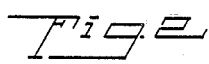
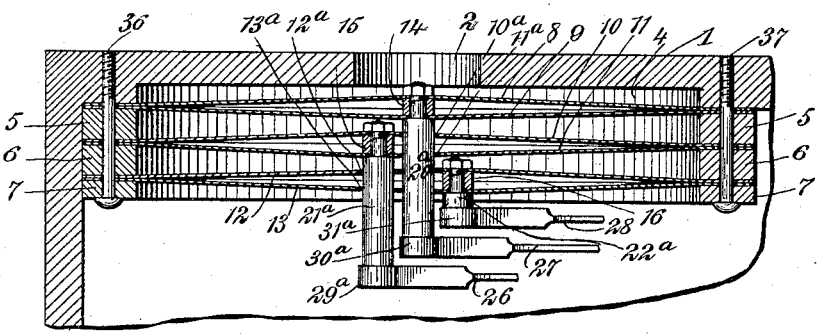
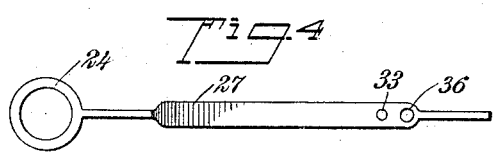
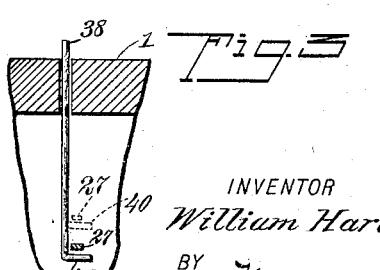
WITNESSES:
J. A. Brophy
Walton Harrison
INVENTOR
William Hart
BY
Munn
ATTORNEYS.
THE NORRIS PETERS CO., PHOTO-LITHO., WASHINGTON, D. C.

No. 727,357. Patented May 5, 1903.

UNITED STATES PATENT OFFICE.

WILLIAM HART, OF KIRKSVILLE, MISSOURI.

GRAPHOPHONE-REPRODUCER.

SPECIFICATION forming part of Letters Patent No. 727,357, dated May 5, 1903.

Application filed August 7, 1902. Serial No. 118,762. (No model.)

*To all whom it may concern:*

Be it known that I, WILLIAM HART, a citizen of the United States, and a resident of Kirksville, in the county of Adair and State of Missouri, have invented new and useful Improvements in Graphophone-Reproducers, of which the following is a full, clear, and exact description.

My invention relates to graphophones, my object more particularly being to improve the sounds made by the reproducer and also to provide certain adjustments for regulating the sounds reproduced.

Reference is to be had to the accompanying drawings, forming a part of this specification, in which similar characters of reference indicate corresponding parts in all the figures.

Figure 1 is a vertical section through my reproducer. Fig. 2 is a somewhat similar view showing certain modifications of minor parts. Fig. 3 is a fragmentary section upon the line $x$ $x$ of Fig. 1, showing one of the adjustments; and Fig. 4 is a plan view of one of the levers connected with a diaphragm and provided with a reproducing-point.

The frame 1 is provided with a sound-aperture 2, in which is fitted the tube 3, upon which the usual trumpet may be mounted. Mounted adjacent to the sound-aperture 2 and concentric therewith is a circular sink 4, as shown more particularly in Figs. 1 and 2. Annular rings or washers 5 6 7 are provided for the purpose of holding the several diaphragms. Each diaphragm consists of a pair of disk-like members 8 9 10 11 12 13, made of resilient material and spaced asunder by means of the annular washers 14 15 16 of the form shown in Fig. 2 and 17 18 19 of the form shown in Fig. 1. The upper diaphragm shown in Fig. 1 is connected with a central depending stem 20. The middle and lower diaphragms shown in said figure are connected, respectively, with the depending sleeves 21 and 22. The stem 20 and sleeves 21 and 22 are, by means of enlarged heads 23 24 25, connected with the respective levers 26 27 28. Somewhat similarly, as indicated in Fig. 2, the three diaphragms may be provided with depending stems $20^a$ $21^a$ $22^a$, which are rigidly connected, by means of the annular fastenings $29^a$ $30^a$ $31^a$, with the levers 26 27 28.

In the modification shown in Fig. 2 the disks 10 11 12 13 are provided with apertures $10^a$, $11^a$, $12^a$, and $13^a$, through which the stems $20^a$ $21^a$ pass loosely, so as not to interfere with the vibration of any part. The levers 26 27 28 are provided with weights 29 30 31 and with reproducing-points 32 33 34, as indicated in Fig. 1. The record 35, from which the reproduction is to be made, is indicated by dotted lines in Fig. 1. The diaphragms and annular rings or washers supporting the same are clamped together and held rigidly in position by means of screws 36 37 and others not shown.

A mute stop, consisting of a section of spring metal 38, bent into the form shown and having hooks 39 40, is provided for the purpose of raising the levers 27 28 in succession. Another mute stop, consisting of a bow 41, provided with a point 42 and secured upon a screw 43, provided with a milled head 44, is mounted upon the tube 3. By turning the milled head 44 the point 42 is brought into engagement with the countersink 45 in the stem 20, thereby lessening the amplitude of the vibrations of the upper diaphragm, consisting of the disks 8 9.

The operation of my device is as follows: The record being placed in position and actuated in the usual manner, the reproducing-points 32 33 34, which are made of sapphire set in sockets and radially inclined, as indicated in Fig. 1, are caused to follow the grooves or track of the record, and thereby cause the diaphragms to vibrate. The weights 29 30 31 are very light, and they only serve to effect greater solidity of movement in the levers and prints. It is not desirable to have these weights heavy, for the reason that their inertia could not be overcome with sufficient rapidity. I have found, however, that if the weights be properly proportioned they greatly improve the quality and loudness of the sounds produced. As the points 32 33 34 are very close together, they act upon substantially the same part of the record, and the sounds produced from the several diaphragms consist substantially, but not exactly, of duplicates. By raising the mute stop 38 the hook 40 raises the lever 27, thereby disengaging the point 33 from the record. Raising the mute stop 38 still higher, the lever 27 in turn raises the lever 28, so that only the point 32 is in contact with the record. When this is the case, the lower end of the mute stop 38 and the hook 40 occupy the positions indicated by dotted lines in Fig. 3. It will be readily seen, therefore, that by means of the mute stop 38 one, two, or three of the reproducing-points may be maintained in engagement with the record, so that the sounds reproduced shall be the vibration of one, two, or three double diaphragms.

By adjusting the milled head 44 shown at the top of Fig. 1 only the upper double diaphragm is affected. Owing to the elasticity of the bow 41, the upper diaphragm can be partially restricted in its movement. In other words, the sound of the upper diaphragm may be deadened to any desired degree.

I find that the sounds produced with the machine above described are much louder, clearer, and richer than with the ordinary reproducer. The double diaphragms are more effective than single diaphragms. The points are maintained in engagement with the record by the elasticity of the diaphragms. By arranging the diaphragms as above described each pair of disks serves as an elastic fastening or spring for normally maintaining one of the levers in its predetermined position, each double diaphragm thereby coacting with one of the weights 29 30 31 for the purpose of maintaining one of the points 32 33 34 in proper resilient contact with the record.

Having thus described my invention, I claim as new and desire to secure by Letters Patent—

1. A graphophone-reproducer, comprising a sound-box, a plurality of diaphragms in the said box, a plurality of points tracking substantially upon the same record of sound, and means for connecting one of said points with each of the said diaphragms.

2. A graphophone-reproducer, comprising a sound-box, a plurality of composite diaphragms built up of pairs of disk-like members connected together at their edges and spaced asunder at their centers, and a lever connected with each of said diaphragms and provided with a reproducing-point for engaging a record, said points tracking substantially upon the same record of sound.

3. A graphophone-reproducer, comprising a sound-box, a plurality of diaphragms mounted therein, a plurality of distinct members, each connected with a diaphragm and provided with a reproducing-point for normally engaging a record, and means successively disengaging said points from said record for the purpose of affecting sounds reproduced.

4. A graphophone-reproducer, comprising a sound-box, a plurality of diaphragms mounted therein, levers, one connected with each of said diaphragms and provided with a reproducing-point for engaging a record, said points tracking substantially upon the same record of sound, and weights mounted upon said levers for effecting greater solidity of movement thereof.

5. A graphophone-reproducer, comprising a sound-box, a plurality of diaphragms mounted therein, a plurality of reproducing-points disposed closely together for engaging a record, said points tracking substantially upon the same record of sound, and means for connecting each diaphragm with a reproducing-point, the arrangement being such that a single record may simultaneously actuate all of said diaphragms, thereby multiplying and blending together a number of distinct reproductions.

6. A graphophone-reproducer, comprising a sound-box, diaphragms mounted therein, reproducing-points for engaging a record, means for connecting each diaphragm with a reproducing-point, and mute stops for governing the sound reproduced.

7. A graphophone-reproducer, comprising a sound-box, a composite diaphragm built up of distinct pairs of disk-like members of resilient material connected together at their edges and spaced asunder at their centers, and members, each connected with a diaphragm and provided with a reproducing-point for engaging a record, said points tracking substantially upon the same record of sound, the arrangement being such that the elasticity of said diaphragms maintains said reproducing-points in engagement with said record.

8. In a graphophone-reproducer, the combination with a sound-box, a plurality of diaphragms in said box, and a plurality of levers, one connected with each of the diaphragms, and each provided with a point, of a mute stop for engaging one of the levers to raise the same.

9. In a graphophone-reproducer, the combination with a sound-box, and a plurality of diaphragms in the box, of a plurality of levers, each provided with a point, one of said levers being apertured to receive the point of an adjacent lever, means for connecting each lever with a diaphragm, and a mute stop for engaging the apertured lever to raise the same.

10. In a graphophone-reproducer, the combination of a sound-box, a plurality of diaphragms in the box, a plurality of points, means for connecting one of said points with each of the said diaphragms, and a mute stop for reducing the vibrations of one of the said diaphragms.

11. In a graphophone-reproducer, the combination of a sound-box, a plurality of diaphragms in the box, a plurality of points, means for connecting one of said points with each of the diaphragms, a mute stop for reducing the vibrations of one of the diaphragms, and a mute stop for raising the points connected with the other two diaphragms.

12. In a graphophone-reproducer, the combination with a sound-box, of a plurality of diaphragms in the box, a stem connected with the upper diaphragm, a sleeve on the stem and with which the next diaphragm is connected, a second sleeve on the first sleeve and with which the third diaphragm is connected, levers carried by the stem and sleeves and each provided with a point, and an adjustable mute stop for engaging the end of said stem.

In testimony whereof I have signed my name to this specification in the presence of two subscribing witnesses.

WILLIAM HART.

Witnesses:
GEO. D. SCOTT,
LEE HORKINS.